United States Patent
Meandzija et al.

(10) Patent No.: US 7,430,606 B1
(45) Date of Patent: Sep. 30, 2008

(54) REDUCING CERTIFICATE REVOCATION LISTS AT ACCESS POINTS IN A WIRELESS ACCESS NETWORK

(75) Inventors: Branislav Meandzija, Del Mar, CA (US); Mithat C. Dogan, Sunnyvale, CA (US); Marc Goldburg, Redwood City, CA (US)

(73) Assignee: ArrayComm, LLC, San Jose, CA (US)

( * ) Notice: Subject to any disclaimer, the term of this patent is extended or adjusted under 35 U.S.C. 154(b) by 775 days.

(21) Appl. No.: 10/689,501

(22) Filed: Oct. 17, 2003

(51) Int. Cl.
  *G06F 15/16* (2006.01)
(52) U.S. Cl. ............... 709/229; 709/223; 709/228
(58) Field of Classification Search ............ 709/229
  See application file for complete search history.

(56) References Cited

U.S. PATENT DOCUMENTS

| | | | |
|---|---|---|---|
| 5,371,794 A | 12/1994 | Diffie et al. | |
| 6,189,098 B1 | 2/2001 | Kaliski | |
| 6,385,651 B2 | 5/2002 | Dancs et al. | |
| 6,516,316 B1 * | 2/2003 | Ramasubramani et al. | 707/9 |
| 6,553,219 B1 * | 4/2003 | Vilander et al. | 455/411 |
| 6,571,221 B1 | 5/2003 | Stewart | |
| 6,754,824 B1 | 6/2004 | Persson | |
| 6,754,829 B1 | 6/2004 | Butt et al. | |
| 6,823,454 B1 | 11/2004 | Hind et al. | |
| 6,856,800 B1 | 2/2005 | Henry et al. | |
| 6,886,095 B1 | 4/2005 | Hind | |
| 6,980,660 B1 | 12/2005 | Hind et al. | |
| 7,042,988 B2 | 5/2006 | Juitt | |
| 7,043,453 B2 | 5/2006 | Stefik et al. | |
| 7,047,405 B2 | 5/2006 | Mauro | |
| 7,073,055 B1 | 7/2006 | Freed et al. | |
| 7,181,620 B1 * | 2/2007 | Hur | 713/171 |
| 7,254,711 B2 | 8/2007 | Shigematsu et al. | |
| 7,266,685 B1 | 9/2007 | Meandzija et al. | |
| 2002/0056050 A1 * | 5/2002 | Heiden et al. | 713/201 |
| 2002/0166048 A1 | 11/2002 | Coulier | |
| 2002/0173981 A1 | 11/2002 | Stewart | |

(Continued)

FOREIGN PATENT DOCUMENTS

GB  2 366 141  2/2002

OTHER PUBLICATIONS

Simpson, et al. "RFC 1661: The Point-to-Point Protocol (PPP)." Jul. 1994.*

(Continued)

*Primary Examiner*—Jason Cardone
*Assistant Examiner*—Nicholas Taylor
(74) *Attorney, Agent, or Firm*—Blakely, Sokoloff, Taylor & Zafman LLP

(57) ABSTRACT

The certificate revocation lists at access points of a wireless access network can be reduced. In one embodiment, an Internet Service Provider ("ISP") connected to the wireless access network can receive a subscription request from a user terminal capable of accessing the ISP using the wireless access network. When the ISP assigns a subscription identifier to the user terminal, it also provides a service certificate signed by a certificate authority including the subscription identifier. In addition, the ISP also provides the user terminal one or more session certificates to be used to access the wireless access network, where the session certificates having a shorter validity period than the service certificate.

20 Claims, 7 Drawing Sheets

U.S. PATENT DOCUMENTS

2003/0135732 A1     7/2003    Vaha-Sipila
2003/0165241 A1*   9/2003    Fransdonk ................ 380/258
2004/0005878 A1     1/2004    Olin
2004/0158716 A1     8/2004    Turtianen

OTHER PUBLICATIONS

Patent Coorperation Treaty, PCT International Search Report, International Application No. PCT/US04/34992, 3 pgs.

* cited by examiner

REDUCING CERTIFICATE REVOCATION LISTS AT ACCESS POINTS IN A WIRELESS ACCESS NETWORK

BACKGROUND OF THE INVENTION

1. Field of the Invention

The present invention applies to the field of hardware authentication, in particular to terminal authentication in a wireless network.

2. Description of the Prior Art

Hardware authentication, also sometimes referred to as entity authentication, is the process of verifying a claimed or presumed identity. In the context of a wireless access network, hardware authentication is used to verify that a an entity is indeed the entity it is claiming to be. For example, a hardware authentication can verify that a terminal claiming to have a certain MAC address really has the claimed MAC address. Without hardware authentication, unauthorized user terminals could steal the resources of the wireless access network, and uplink and downlink communications between legitimate user terminals and access points may be intercepted and eavesdropped.

Hardware authentication in wireless networks is currently accomplished by time varying challenge-response protocols. In a typical challenge-response protocol a claimant proves its identity to a verifier by demonstrating knowledge of a secret known to be associated with the claimant.

One problem with challenge-response protocols is that the verifier needs access to a secure database to identify the secret the claimant should have. Furthermore, such protocols require several message exchanges and on-the-fly encryption that can slow down network access.

BRIEF SUMMARY OF THE INVENTION

The certificate revocation lists at access points of a wireless access network can be reduced. In one embodiment, an Internet Service Provider ("ISP") connected to the wireless access network can receive a subscription request from a user terminal capable of accessing the ISP using the wireless access network. When the ISP assigns a subscription identifier to the user terminal, it also provides a service certificate signed by a certificate authority including the subscription identifier. In addition, the ISP also provides the user terminal one or more session certificates to be used to access the wireless access network, where the session certificates having a shorter validity period than the service certificate.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Wireless Access Network

Figure 1:
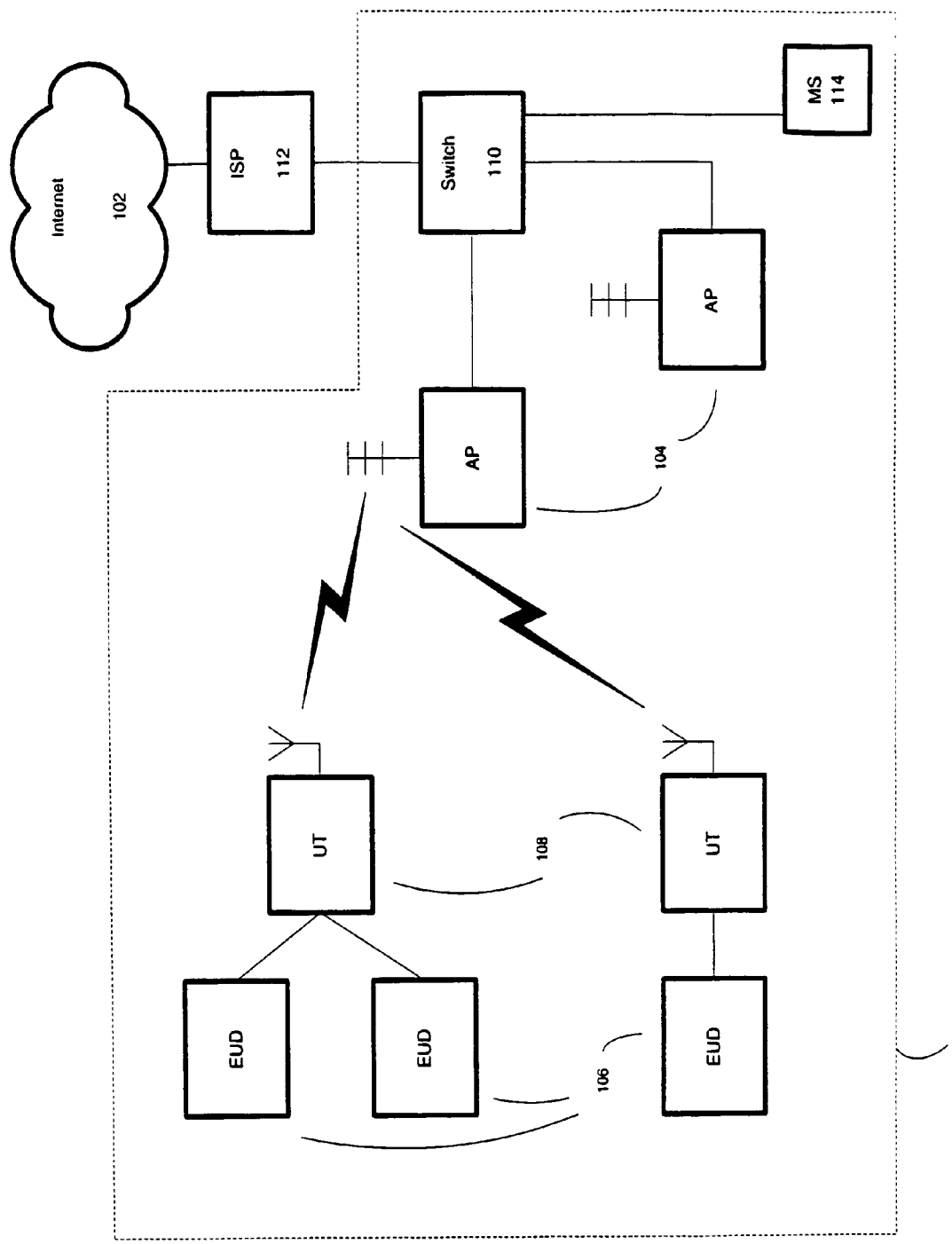
FIG. 1 is a simplified block diagram of a wireless access network in which one embodiment of the present invention can be practiced.

An example system that can implement embodiments of the present invention is now described with reference to FIG. 1. FIG. 1 shows a wireless access network 100. The wireless access network can be used to provide access to the Internet 102, or any other data network, such as a LAN or WAN.

The wireless access network 100 includes wireless access points 104 ("AP") to allow end user devices 106 ("EUD") to communicate using wireless user terminals 108 ("UT"). An EUD 106 is generally a mobile computing device, such as a laptop or notebook computer, a personal digital assistant ("PDA"), or a cellular telephone. However, an EUD 106 can be any other computing device, such as a desktop computer or a workstation.

A UT 108 can be implemented as a stand-alone unit, such as a PCMCIA card or box, or be integrated into the body of the EUD 106. One UT 108 can provide communications for just one EUD 106 or a group of EUDs 106. The UT 108 is a communications device analogous to a modem. The UT 108 can be responsible for radio communications and physical layer signal processing. Higher lever processing can be performed by either the UT 108 or a host EUD 106.

The UT 108 communicates wirelessly, e.g. using radio signals, with an AP 104. An AP can be a cellular base station, an 802.11 access point, or other wireless system access point, such as an i-Burst™ base station. Multiple APs can be connected by a switch 110 or router to centralize the connection to an Internet Service Provider ("ISP") 112 and to facilitate handoffs when a UT 108 moves from one AP 104 zone into another.

The ISP, such as America Online, Prodigy, and SBC among others, facilitates access to the Internet 102. Users of the EUDs 106 subscribe to Internet service with the ISP 112. The Wireless Access Network 100 allows these users to access the Internet 102 wirelessly.

In one embodiment, the switch 110 is also coupled with a management server ("MS") 114. The MS 114 can perform various network management functions, such as service authorization, statistics gathering, and over-the-air configuration for UTs 108.

FIG. 1 is a highly simplified diagram. In a real life network there could be a hierarchy of switches 110 and hubs connecting thousands of APs 104 with a variety of ISPs 112. Furthermore, embodiments of the present invention need not be practiced in a strict wireless access network context. For example, one embodiment of the present invention may be in a wireless peer-to-peer network During authentication however, one peer will be acting as an AP 104 and the other as the UT 108 of a wireless access network.

Authentication Protocol

Figure 2:
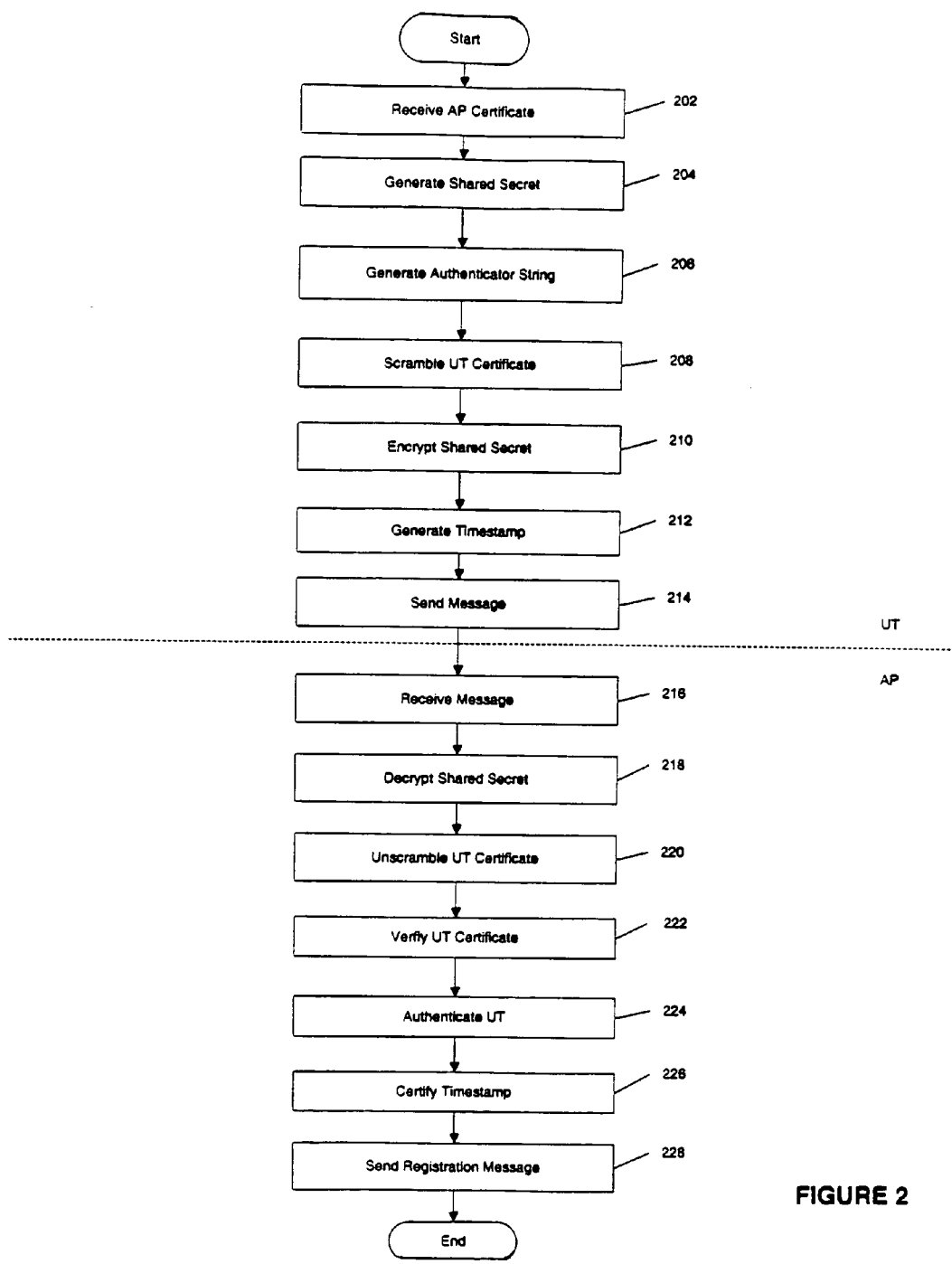
FIG. 2 is a simplified flow chart of an authentication protocol according to one embodiment of the present invention.

An example authentication protocol in which embodiments of the present invention can be used is shown in FIG. 2. FIG. 2 also contains details not necessary to practice the present invention that are provided for clarity and context. The process and message exchange described with reference to FIG. 2 is mostly related to UT 108 authentication. However, the process can also result in AP 104 authentication and the exchange of a shared secret to be used later for encryption.

When at a UT 108 arrives in the coverage area of an AP 104 it begins the registration process. Registration is a relationship that enables the UT 108 to exchange communications streams with the AP 104. The authentication protocol described with reference to FIG. 2 is a part of the registration process.

Since the authentication protocol described with reference to FIG. 2 is certificate-based, before registration begins the UT 108 and the AP 104 are each assigned at least one digital certificate from one or more trusted entities, such as certificate authorities ("CA"). A digital certificate is a text message that is signed by the CA. The signature may be a digest of the text message encrypted with a CA private key that only the CA has access to, but that can be verified by any entity which knows the CA public key which is openly available.

To verify a certificate, one decrypts the signature with the published CA public key and computes the digest from the text message. If these two text strings match, then the certificate was indeed signed by the CA. There are commercial CAs, such as VeriSign, Inc., or a network operator can create its own CAs. Public key cryptography and its use to create and verify digital certificates is well known.

In one embodiment, the UT 108 has no independent time reference and receives its sense of time from the AP 104. For example, the AP 104 can include an absolute frame number in a broadcast burst or some communication addressed to the UT 104.

The authentication protocol can begin when the UT 104 receives the AP certificate in block 202. The AP certificate can include an identity of the AP 104, such as a media access control (MAC) address of the AP 104, which identifies the AP 104 either uniquely or network-wide. The certificate also includes the AP public key that corresponds with the private key of the AP 104. The AP 104 may use different public/private key pairs for different UTs 108. As explained above, the AP certificate is signed by a CA trusted by the UT 108.

In block 204, the UT 108 generates a shared secret. This shared secret is only known by the UT 108 at this point and will only be shared with the AP 104. The shared secret can be generated as a random sequence using a random number sequence generator. In one embodiment, at least a part of this shared secret will later be used as a master secret to encrypt communications between the UT 108 and the AP 104 using symmetric key cryptography. The necessity of establishing such a secret for symmetric key cryptography is well known.

In block 206, the UT 108 generates an authenticator string. One key purpose of the authenticator string is to demonstrate that the UT 108 is in possession of the UT private key corresponding to the UT public key contained in the UT certificate. Since the CA certifies that the public key belongs to the UT 108, any device having the corresponding private key is the authentic UT 108.

There are numerous possible authenticator strings that can demonstrate possession of the UT private key. For example, the UT can encrypt a part of the shared secret with the private key. In one embodiment, the UT 108 can generate an authenticator message and sign it with the UT private key. If the AP 104 can independently generate the authenticator message, the authenticator string can be the signature only.

In block 208, the UT 108 scrambles the UT certificate given to it by the CA. The UT certificate includes an identifier of the UT 108, such as its MAC address, and a public key associated with the private key used to sign the authenticator string. The certificate can include various other data fields containing information about the UT 108. One reason for scrambling the UT certificate is to hide the UT identifier. This makes tracking the UT 108 difficult.

In one embodiment, the UT certificate is scrambled using at least a part of the shared secret. In one embodiment, the bits of the shared secret that are used for scrambling are not reused for symmetric key cryptography later on. For example, the designated scrambling bits of the shared secret can be used to seed a linear feedback shift register whose output can be used to scramble the UT certificate. In one embodiment, the bits generated by the linear feedback shift register are XOR-ed with the bits of the UT certificate.

In block 210, the UT 108 encrypts the shared secret generated in block 204 with the AP public key contained in the AP certificate received in block 202. In one embodiment, the UT also generates a timestamp in block 212. The timestamp represents time as known by the UT 108. In one embodiment, the UT 108 derives its sense of time from the AP 104 as explained above.

In block 214, the UT 108 sends a message to the AP 104 that the AP 104 can use to authenticate the UT 108. In one embodiment, the message includes the shared secret generated in block 204 and encrypted in block 210, the UT certificate issued by the CA and scrambled in block 208, and the authenticator string generated in block 206. Furthermore, the message can also include the timestamp generated in block 212 to protect against replay attacks.

In one embodiment, the message is a UT parameters message, which in addition to the above, also includes a variety of other information, some of which may be encrypted with the AP public key. For example, the UT parameters message can also include such parameters of the UT 108 as the communication capabilities and preferences of the UT 108.

The ordering of the blocks in FIG. 2 represents merely one embodiment, and is in no way limiting. In some embodiments, several values to be included in the UT parameters message can be pre-calculated. Some blocks will thus be performed in different orders. Other blocks can be completely omitted. For example, if the UT 108 already has a trusted time reference, e.g. when the UT 108 already has the time from an authenticated AP 104, block 226 and perhaps block 212 may be omitted. Furthermore, the UT 108 may have a stored copy of the AP certificate from a prior registration. In this case block 202 may have been already performed. In one embodiment, the UT 108 stores AP certificates, or at least AP public keys, for several frequently accessed APs 104.

In one embodiment, the UT 108 generates the shared secret in block 204 before registration even begins. In other embodiments, multiple shared secrets can be generated to be used for different access points 104. In one embodiment, The UT 108 generates the shared secret, block 204, and encrypts it with several stored AP public keys stored in memory, block 210, before ever receiving the AP certificate in block 202. Furthermore, once the shared secret is generated, block 204, it can be used to scramble the UT certificate, block 208, before registration even begins, and certainly before receiving the AP certificate in block 202. In other embodiments, the authenticator string can be generated in block 206 prior to receiving the AP certificate in block 202.

As demonstrated above, the blocks of FIG. 2 that are performed by the UT 108 can be performed in various orders, and the invention is not limited to any specific event flow. Various values may be pre-calculated before registration begins, or while awaiting a protocol response from the AP 104. Furthermore, some blocks may be performed in parallel, while others may simply be switched. Pre-calculating values and speculatively encrypting the shared secret by guessing the AP identity and public key can further increase the speed and efficiency of the authentication protocol.

Referring again to FIG. 2, in block 216, the AP 104 receives the UT parameters message sent by the UT 108. In block 218, the AP uses its private key to decrypt the shared secret. After the AP is in possession of the shared secret, in block 220, the AP can unscramble the UT certificate. Since at least a part of the shared secret was used in scrambling the UT certificate, only the AP 104 can unscramble it, since only the AP 104 has the AP private key necessary to decrypt the shared secret.

In block 222, the AP verifies the UT certificate by checking the CA signature and any validity period associated with the UT certificate. The UT certificate, as explained above, contains the UT public key, and the CA signature assures that this UT public key is assigned to a UT having the identifier, e.g., MAC address, also included in the UT certificate.

In block 224, the AP 104 authenticates the UT 108. This can be accomplished by using the authenticator string to verify that the UT 104 is in possession of the UT private key corresponding to the UT public key in the UT certificate. In one embodiment, the authenticator string is the UT signature over an authenticator message. The UT signature can be a digest, i.e. hash, of the authenticator message encrypted with the UT private key. Other digital signatures are also possible, such as encrypting the entire authenticator message, or a part thereof, with the UT private key.

In one embodiment, the AP 104 can generate the authenticator message and the authenticator message digest independently. In this case, the AP 104 decrypts the authenticator string with the UT public key, generates a digest of the authenticator message, and compares the decrypted authenticator string to the independently generated authenticator message digest. In this manner, the AP 104 can verify that the UT 108 is in possession of the UT private key paired with the UT public key in the UT certificate.

In one embodiment, the UT 108 can also request time certification. In such an embodiment, the UT's 108 sense of time is derived from the AP 104 when the UT powers up. Thus, at least when a cold-start is performed but in other situations as well, an unauthorized AP could use an expired certificate and give a UT a false time reference that makes the certificate appear valid. To mitigate this problem, the UT 108 can ask the AP 108 to certify the timestamp generated by the UT 104 in block 212.

If the UT 108 requests time verification, in block 226, the AP can certify the timestamp. The timestamp can be included in the UT parameters message as a protection against replay attacks, but it can also be used for time certification. In one embodiment, the AP 104 performs time certification in block 226 by forwarding the timestamp to a trusted time server ("TS"). The TS is trusted by the UT 108, and can be a CA, or any server known to be operated by the network operator or some other trusted entity.

In one embodiment, the TS certifies the timestamp and sends it back to the AP 104, which in turn forwards it on the UT 108. In one embodiment, in block 228, the AP 104 sends a registration parameters message to the UT 108 including various registration parameters—such as random access channels, a paging identifier, and a registration identifier—and the certified timestamp is included in this message. In other embodiments, the TS may communicate the certification directly to the UT 108, or by some other means besides the AP 104.

According to one embodiment described with reference to FIG. 2, the AP 104 can authenticate the UT 108 using a single message from the UT 108. In one embodiment, all further communication between the UT 108 and the AP 104 is encrypted using the shared secret, or a part of it, for symmetric cryptography. In this case, when the AP 104 sends the registration message in block 228, the AP 104 is implicitly authenticated, since only the AP possessing the AP private key has the shared secret outside of the UT 108.

User Terminal Certificates

The UT certificate signed by the CA that the UT 108 presents to the AP 104 during the authentication procedure has been described above in some detail. In one embodiment, there can be various different UT certificates used at different times. In one embodiment, the original UT certificate possessed by a UT 108 can be called the identity certificate.

In one embodiment, the identity certificate is tied to the hardware of the UT 108. One hardware identifier of the UT 108 is its serial number. More specifically, the hardware of a UT 108 is uniquely identified by its Ethernet address, or its hardware identity according to some other global addressing system. In one embodiment, this unique hardware identity, such as the serial number, is included in the plaintext of the identity certificate. An example identity certificate can contain fields such as:

1. Certificate Authority Identifier—Identifies the CA to be used to authenticate.
2. Certificate Tye—Specifies certificate type, such as "Identity".
3. Serial Number of Certificate—Value assigned by the CA that within a certificate validity period uniquely identifies any certificate issued by that CA.
4. Validity Period—Sets expiration time.
5. UT Serial Number—Hardware address that identifies the UT that owns the certificate. For example, this is formatted as the IEEE Ethernet MAC address of the UT.
6. UT Public Identity Key—The public key used to send encrypted messages to the UT.

Field 5 of this example identity certificate ties the certificate to the hardware of the UT 108. Such an identity certificate is unique, and can thus prevent cloning of—unauthorized masquerading as—the UT 108 the having the identity certificate. Furthermore, because the identity certificate requires no knowledge about the ISP 112 subscribed to by the user of the EUD 106, or the wireless access network 100 to be used to access the ISP 112, the identity certificate can be factory seeded into the UT 108 by the UT's manufacturer. As such, it can be used for initial authentication.

Figure 3:
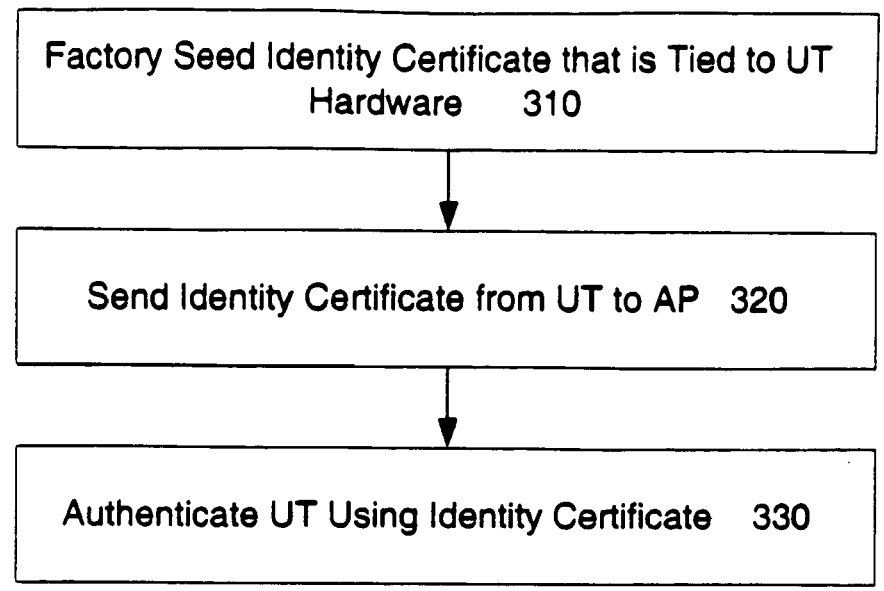
FIG. 3 is a simplified flow chart of identity certificate based authentication according to one embodiment of the present invention

Such an authentication is described with reference to FIG. 3. In block 310, the UT 108 is seeded with an identity certificate that is tied to the UT hardware on manufacture. Seeding the identity certificate can be accomplished by storing the certificate, signed by the CA, in a main or secure memory of the UT 108.

In block 320, the identity certificate is sent to the AP 104 from the UT 108, for example as part of the message sent in block 214 of FIG. 2. The AP 104 then authenticates the UT 108 in block 330 using the identity certificate as the UT certificate, as described with reference to block 222 of FIG. 2. In this manner, the AP 104 can authenticate UTs 108 regardless of manufacturer or service provider, enabling the UTs 108 to globally roam to any network that trusts the CA.

Another type of UT certificate can be called a service certificate. In one embodiment, the service certificate is obtained in addition to the identity certificate. In other embodiments it can be the exclusive UT certificate. The service certificate is also signed by a CA, and can be issued to the UT 108 from the ISP 112.

The service certificate includes the subscription identifier of the UT 108 that corresponds to its subscription with the ISP 112. An example service certificate can contain, in addition to the fields of the identity certificate shown above, a field including the International Mobile Service Identifier (IMSI) of the UT 108, as assigned by the ISP 112. Other identifiers can also be used.

In one embodiment, the service certificate indicates the quality—or grade—of service granted to the UT 108 by the subscription. For example, if a user of an EUD 206 connection to the ISP 112 using a UT 108 chooses to subscribe to one high-speed data and one voice session, a code representing this grade of service can be included in the service certificate, either in the same field, or in a separate field than the subscription identifier.

Since the subscription identifier and the grade of service are not known at manufacture of the UT 108, they need to be downloaded at a later time. In one embodiment, this is done using the identity certificate, or some other factory seeded UT certificate. One embodiment of such a process is described with reference to FIG. 4. To block 410, the AP 104 receives the factory seeded certificate—for example the identity certificate—from a UT 108 that is registering for the first time, or that has no current subscription.

In block 420, the UT 108 is authenticated in a manner similar to that described above with reference to block 330 of FIG. 3. In one embodiment, the use of the factory-seeded certificate alerts the AP 104 or the MS 114 that the network access is an initial sign-in. As such, the UT 108 can be directed to a subscription service, such as ISP 112. Thus, in block 430, the AP 104 allows the connection between the UT 108 and the ISP 112.

After the user exchanges subscription information with the ISP 112, for example, a selected level of service and a credit card number, the ISP 112 uses the certificate it received from the UT 108 to create a service certificate from the UT 108. To do this, the ISP 112 assigns a subscription identifier, such as an IMSI, to the UT 108. Furthermore, the ISP 112 can also assign a code representing the grade of service of the subscription to the UT 108. These values are added to the plain-text of the new certificate, which is then signed by a CA trusted by the ISP 112.

In block 440, this new certificate—the service certificate—is sent from the ISP 112 to the AP 104 facilitating the initial connection. In block 450, the AP 104 forwards the service certificate to the UT 108, which stores it in a memory for future authentications. Using the service certificate, the UT 108 can authenticate itself to the AP 104 and the ISP 112 in a single communication. Furthermore, the AP 104 can tell what quality of service it should provide to the UT 108 based on the service certificate. This would otherwise not be possible with a factory-seeded certificate.

In a certificate-based authentication scheme, the access network 100 must keep a certificate revocation list (CRL) at various nodes—such as the APs 104, switches 110, or MSs 114—to keep track of certificates that have not yet expired, but have become invalid. For example, if the user of a UT 108 allows his subscription to lapse, his downloaded service certificate will have to be revoked, even though its validity period has not expired. Therefore, the longer the validity periods of the service certificates, the longer the CRLs need to be.

Since CRLs consume physical resources, such as memory, and computational resources, such as search, it is desirable to keep CRLs shorter rather than longer. However, keeping the CRLs short by reducing the validity periods of the service certificates would require the frequent downloading of service certificates using the process described with reference to FIG. 4. That would mean, that each time the service certificate expired—which, to keep the CLRs short would be several times a day—a new subscription, or a verification of the subscription, would be required.

The CLRs at the APs 104 can be reduced without shortening the validity period of the service certificate, according to some embodiments of the present invention. In one embodiment, the UT 108 is assigned one or more session certificates by the ISP 112, depending on the number of authorized sessions a UT 108 is allowed to maintain simultaneously. A session certificate can include, in addition to the other fields of the service certificate, a session identifier associated with a session to be had by the UT 108. For example, the session identifier can uniquely identify a Point to Point Protocol (PPP) Session within the UT 108.

One embodiment of authentication using the session certificates is described with reference to FIG. 5. In block 510, the ISP 112 receives the initial subscription request from a new user. In block 520, the subscription is granted. In this example, the grade of service is two concurrent sessions, one for high-speed data, and one for Voice Over IP (VoIP). In block 530, the ISP 112 assigns the subscription identifier to the UT 108, and generates and delivers the service certificate to the UT 108.

In addition to the service certificate, in block 540, the ISP 112 also provides two session certificates, one for each allowed session, each having a unique session identifier. The session certificates have shorter validity periods than the service certificate.

In one embodiment, each session certificate is only valid for a single session. Having a session certificate, among other things, helps prevent session theft during handover, since each authorized session must be authenticated by a certificate.

When the UT 108 requests more session certificates, e.g., because they have expired, the UT provides the ISP 112 with the service certificate. In block 550, the ISP 112 determines whether the service certificate is valid by checking the CRL in the ISP 112 management entity. If it is still valid, then the ISP 112 creates new session certificates and provides them to the UT, as in block 540.

If the service certificate is not valid because it has been revoked, then the ISP 112 denies service to the UT 108 in block 560. The UT 108 can then be prompted to produce the identity certificate to be authenticated and granted a new subscription. Thus, when a potentially lengthy CRL—the one for the service certificates—needs to be examined, the search is performed by the ISP 112. Most of the time, the APs 104 only have to search the relatively short session certificate CRLs when authenticating a UT 108.

Access Point Structure

Figure 4:
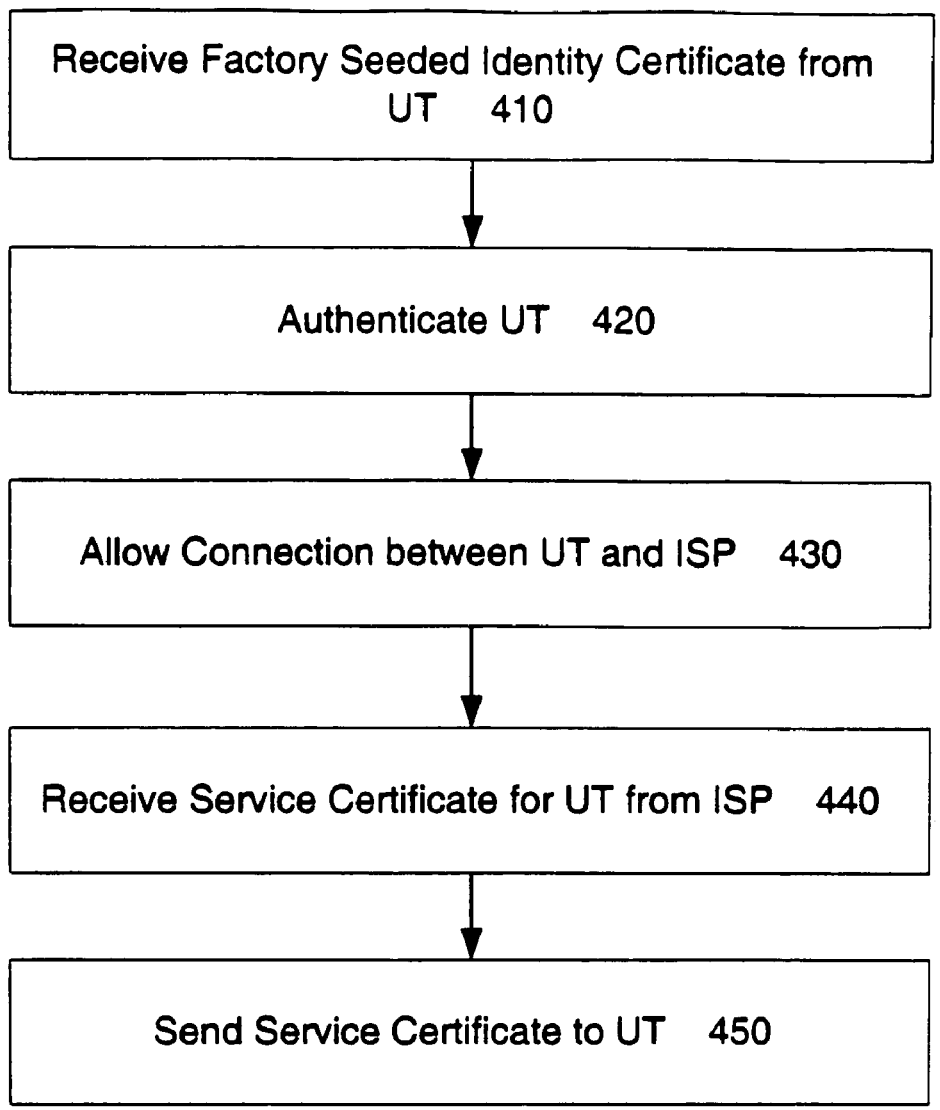
FIG. 4 is a simplified flow chart of service certificate downloading according to one embodiment of the present invention.

Embodiments of an AP 104 and a UT 108 of a wireless access network are now described. FIG. 4 shows an example of an AP of a wireless access network or cellular communication network suitable for implementing the present invention. The system or network includes a number of subscriber stations, also referred to as remote terminals or UTs, such as that shown in FIG. 1 as UT 108 and in detail in FIG. 5. The AP may be connected to a wide area network (WAN) or the Internet through its host DSP 31 for providing any required data services and connections external to the immediate wireless system. To support spatial diversity, a plurality of antennas 3 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the AP to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the present example, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 (hereinafter "timeslot processor") for further processing, including calibration, according to one aspect of this invention. Eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each UT to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the AP. Furthermore DSP 31 may include a memory element to store data, instructions, or hopping functions or sequences. Alternatively, the AP may have a separate memory element or have access to an auxiliary memory element. With respect to the other parts of the AP it formats service data and traffic data for further higher processing in the AP, receives downlink messages and traffic data from the other parts of the AP, processes the downlink bursts and formats and sends the downlink bursts to a transmit controller/modulator, shown as 37. The host DSP also manages programming of other components of the AP including the transmit controller/modulator 37 and the RF timing controller shown as 33.

The RF timing controller 33 interfaces with the RF system, shown as block 45 and also produces a number of timing signals that are used by both the RF system and the modem. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 35. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 35. The transmit modules 35 up-convert the signals to the transmission frequency and amplify the signals. The amplified transmission signal outputs are sent to antennas 3 via the duplexer/time switch 7.

User Terminal Structure

Figure 5:
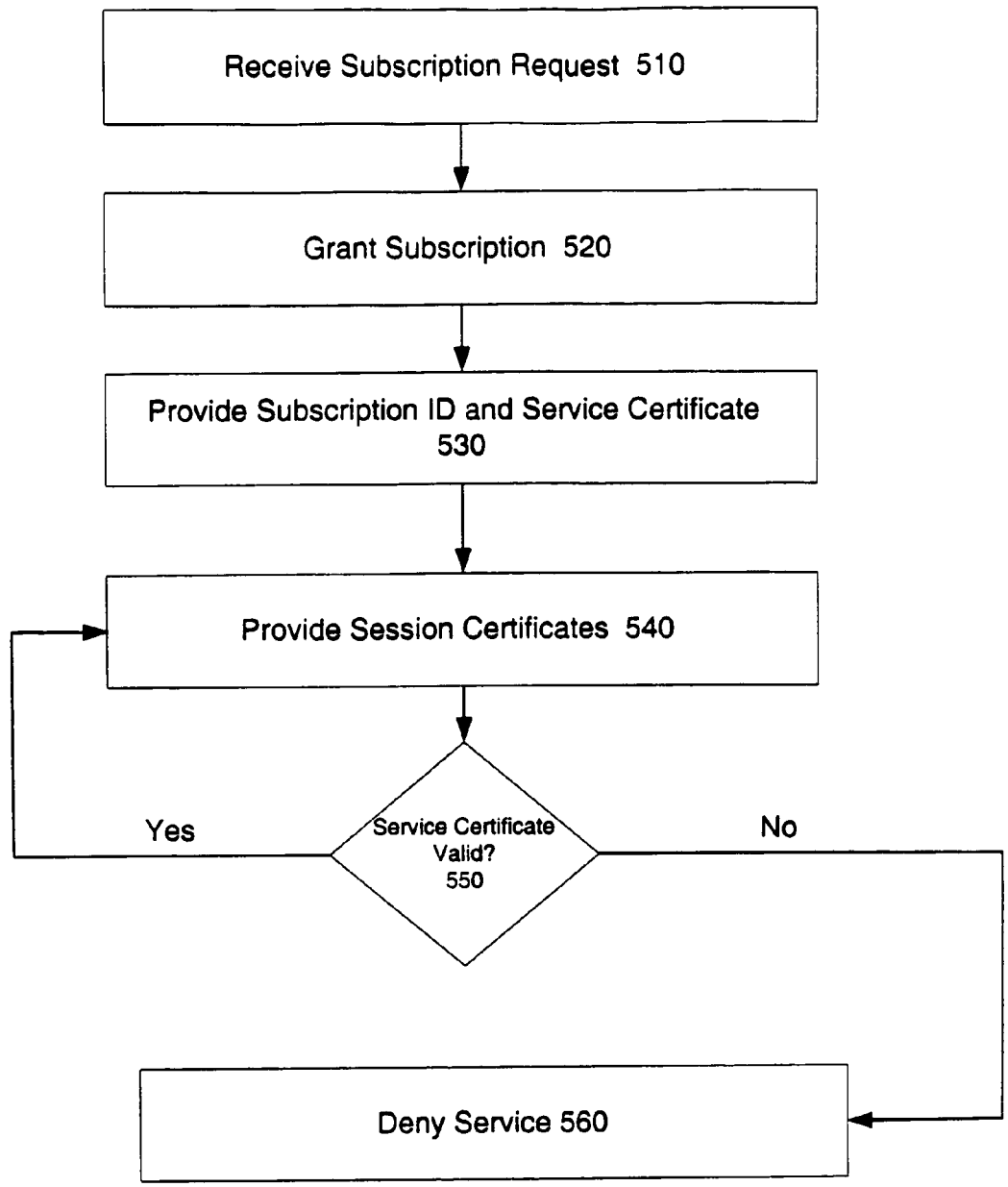
FIG. 5 is a simplified flow chart session certificate granting according to one embodiment of the present invention.
Figure 6:
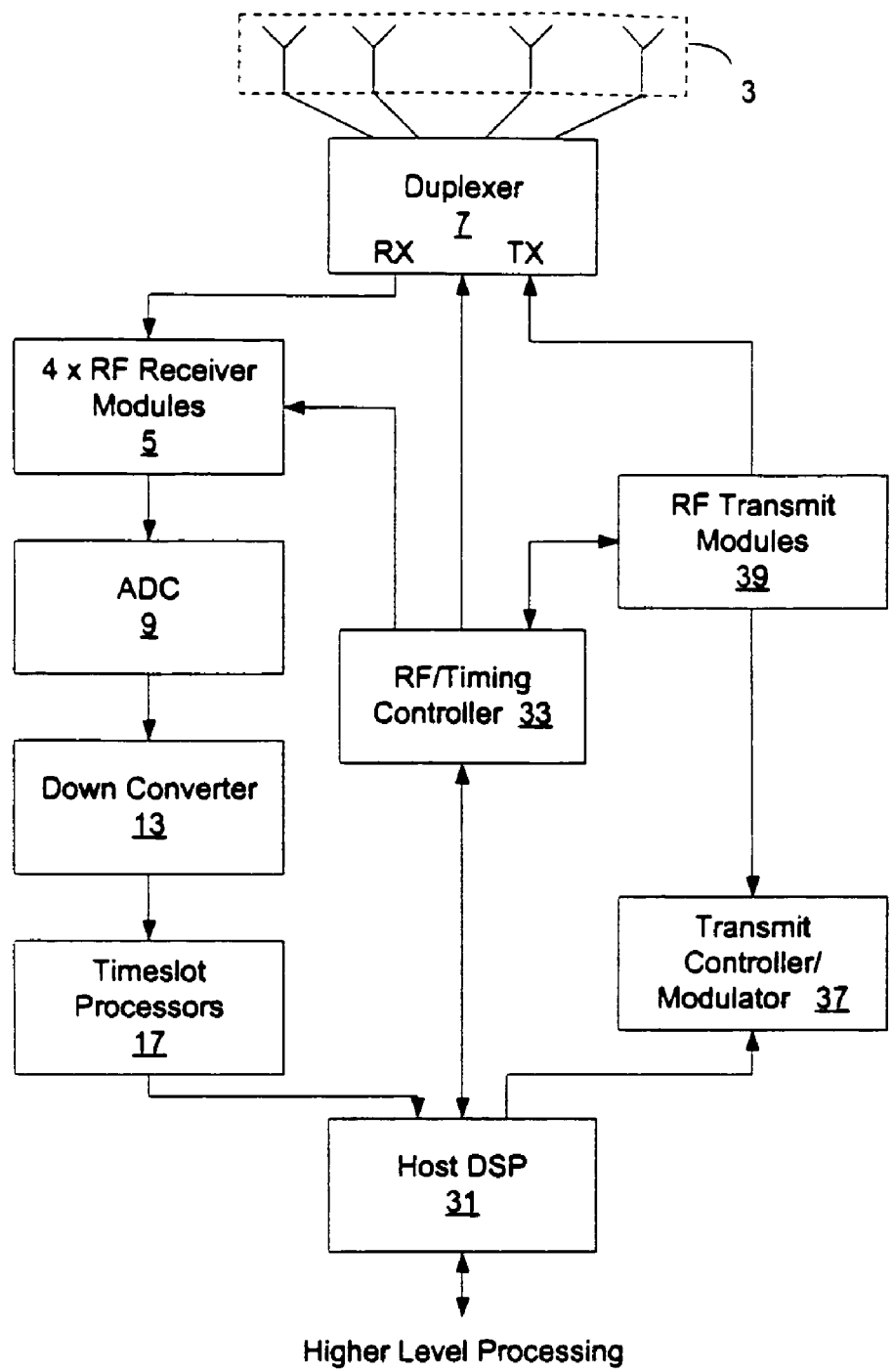
FIG. 6 is a simplified block diagram of an access point on which an embodiment of the invention can be implemented.
Figure 7:
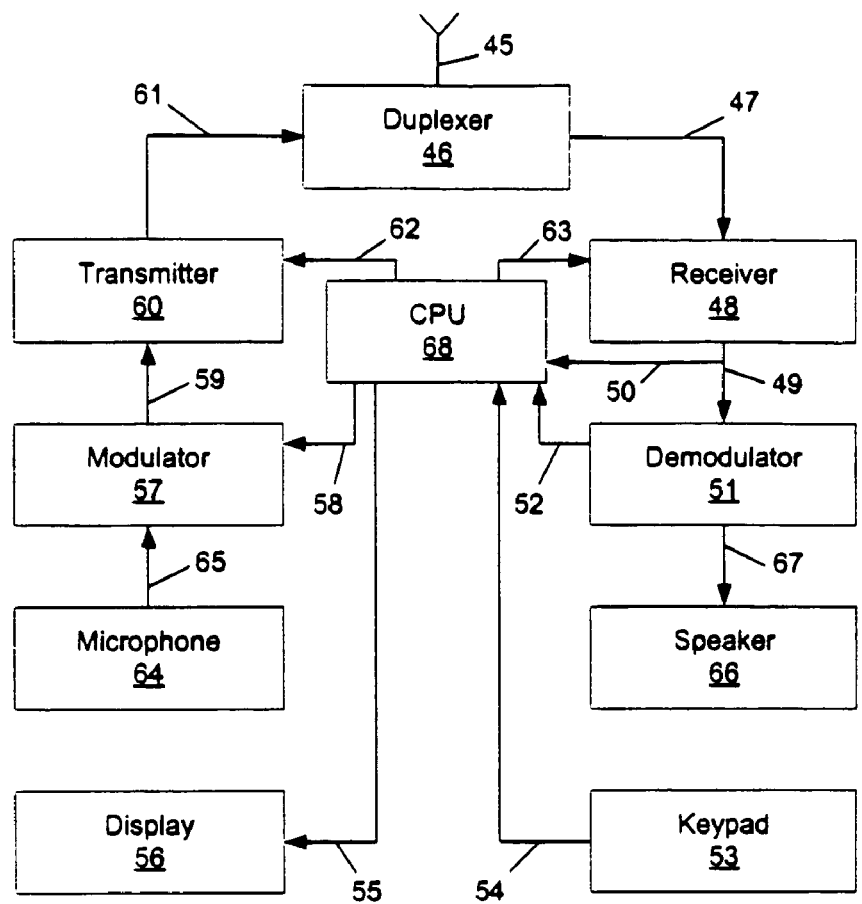
FIG. 7 is a simplified block diagram of a user terminal on which an embodiment of the invention can be implemented.

FIG. 5 depicts an example component arrangement in a UT that provides data or voice communication. The user terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the AP. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The user terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a user terminal central processing unit 68 (CPU) as is received data before demodulation 50. The user terminal CPU 68 can be implemented with a standard DSP (digital signal processor) device such as a Motorola series 56300 Family DSP. This DSP can also perform the functions of the demodulator 51 and the modulator 57. The user terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications user terminal. In another embodiment, the microphone and speaker are also in direct communication with the CPU to provide voice or data communications. Furthermore user terminal CPU 68 may also include a memory element to store data, instructions, and hopping functions or sequences. Alternatively, the user terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the user terminal's CPU is coupled to a standard digital interface such as a PCMCIA interface to an external computer and the display, keyboard, microphone and speaker are a part of the external computer. The user terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 4 and 5, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the AP or the UT. However, many of the steps described as being performed by the AP may be performed by the UT and vice versa. Furthermore, the invention is equally applicable to systems in which terminals communicate with each other without either one being designated as a AP, a UT, a user terminal or a subscriber station. Thus, the present invention is equally applicable and useful in a peer-to-peer wireless network of communications devices. In such a network, during the execution of the authentication protocol the devices would take turns acting in the manner of the UT and the AP described above. These devices may be cellular phones, PDA's, laptop computers, or any other wireless devices. Generally, since both the APs and the UTs use radio waves, they are sometimes referred to as radios.

In portions of the description above, only the AP is described as performing spatial processing using an antenna array. However, the UTs can also contain antenna arrays, and can also perform spatial processing both on receiving and transmitting (uplink and downlink) within the scope of the present invention.

Embodiments of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and calculations are described in their most basic form, but steps can be added to or deleted from any of the methods and information can be added or subtracted from any of the described message signals without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:

receiving a subscription request at an Internet Service Provider (ISP) from a user terminal through an access point of an access network;

assigning a subscription identifier to the user terminal at the ISP in response to the subscription request;

generating at the ISP a service certificate signed by a certificate authority and that includes the subscription identifier to identify a subscription of the user terminal with the ISP;

adding the service certificate to a certificate revocation list (CRL) maintained by the ISP;

receiving the service certificate from the user terminal at the ISP;

checking the service certificate against the certificate revocation list (CRL) maintained by the ISP; and providing from the ISP, to the user terminal, if the service certificate is valid, a session certificate to be used to access the access network through the access point, the session certificate having a shorter validity period than the service certificate.

2. The method of claim 1, wherein receiving the service certificate comprises receiving the service certificate through the access point being used by a user terminal to access the access network.

3. The method of claim 2, wherein checking the service certificate comprises searching a certificate revocation list at the ISP.

4. The method of claim 1, wherein the session certificate is associated with a link-level session available to the user terminal.

5. The method of claim 1, wherein the link-level session comprises a PPP session.

6. A method comprising:
receiving a digital certificate at an access point of an access network from a user terminal seeking access to the access network, the digital certificate to be used to authenticate the user terminal;
determining, at the access point, a type of the digital certificate;
if the certificate is a session certificate, then determining the validity of the digital certificate by searching a certificate revocation list (CRL) at the access point that is associated with session certificates; and
if the certificate is a service certificate, then sending the certificate to an Internet Service Provider (ISP) to determine the validity of the certificate.

7. The method of claim 6, wherein determining the type of the digital certificate comprises determining the length of the digital certificate.

8. The method of claim 6, wherein the validity periods of session certificates is shorter than the validity periods of service certificates.

9. The method of claim 8, wherein the CRL associated with session certificates is shorter than the CRL associated with service certificates.

10. A user terminal capable of communicating with an access network, the user terminal comprising:
a memory to store:
a service certificate issued by an Internet Service Provider ("ISP") and signed by a certificate authority, the service certificate having a first validity period, the service certificate corresponding with a subscription of the user terminal with the ISP and including a subscription identifier, the service certificate to be used by the access network to authenticate the user terminal with the ISP; and
a session certificate issued by the ISP and signed by the certificate authority, the session certificate having a second validity period that is shorter in duration than the first validity period, the session certificate corresponding with a session subscribed to by the user terminal and to be used by the access network to authenticate the user terminal to an access point of the access network.

11. The user terminal of claim 10, wherein the session comprises a link-level session.

12. The user terminal of claim 11, wherein the link-level session comprises a PPP session.

13. A machine-readable storage medium having stored thereon data representing instructions that, when executed by a processor of an Internet Service Provider ("ISP"), cause the processor to perform operations comprising:
receiving a subscription request at an Internet Service Provider (ISP) from a user terminal through an access point of an access network;
assigning a subscription identifier to the user terminal at the ISP in response to the subscription request;
generating at the ISP a service certificate signed by a certificate authority and that includes the subscription identifier to identify a subscription of the user terminal with the ISP;
adding the service certificate to a certificate revocation list (CRL) maintained by the ISP;
receiving the service certificate from the user terminal at the ISP;
checking the service certificate against the certificate revocation list (CRL) maintained by the ISP; and
providing from the ISP, to the user terminal, if the service certificate is valid, a session certificate to be used to access the access network through the access point, the session certificate having a shorter validity period than the service certificate.

14. The machine-readable storage medium of claim 13, wherein receiving the service certificate comprises receiving the service certificate through the access point being used by a user terminal to access the access network.

15. The machine-readable storage medium of claim 14, wherein checking the service certificate comprises searching a certificate revocation list.

16. The machine-readable storage medium of claim 13, wherein the session certificate is associated with a link-level session available to the user terminal.

17. The machine-readable storage medium of claim 13, wherein the link-level session comprises a PPP session.

18. The method of claim 1, wherein the service certificate further includes an indication of a grade of service granted to the user terminal for the subscription.

19. The user terminal of claim 10, wherein the service certificate is authenticated by the ISP and the session certificate is authenticated at the access point.

20. The user terminal of claim 19, wherein the service certificate is authenticated using a certificate revocation list (CRL) maintained by the ISP and the session certificate is authenticated using a CRL maintained by the access point.

* * * * *